No. 861,323. PATENTED JULY 30, 1907.
J. W. SHARICK.
PRESSURE DEVICE FOR GRAIN DRILLS.
APPLICATION FILED APR. 9, 1907.
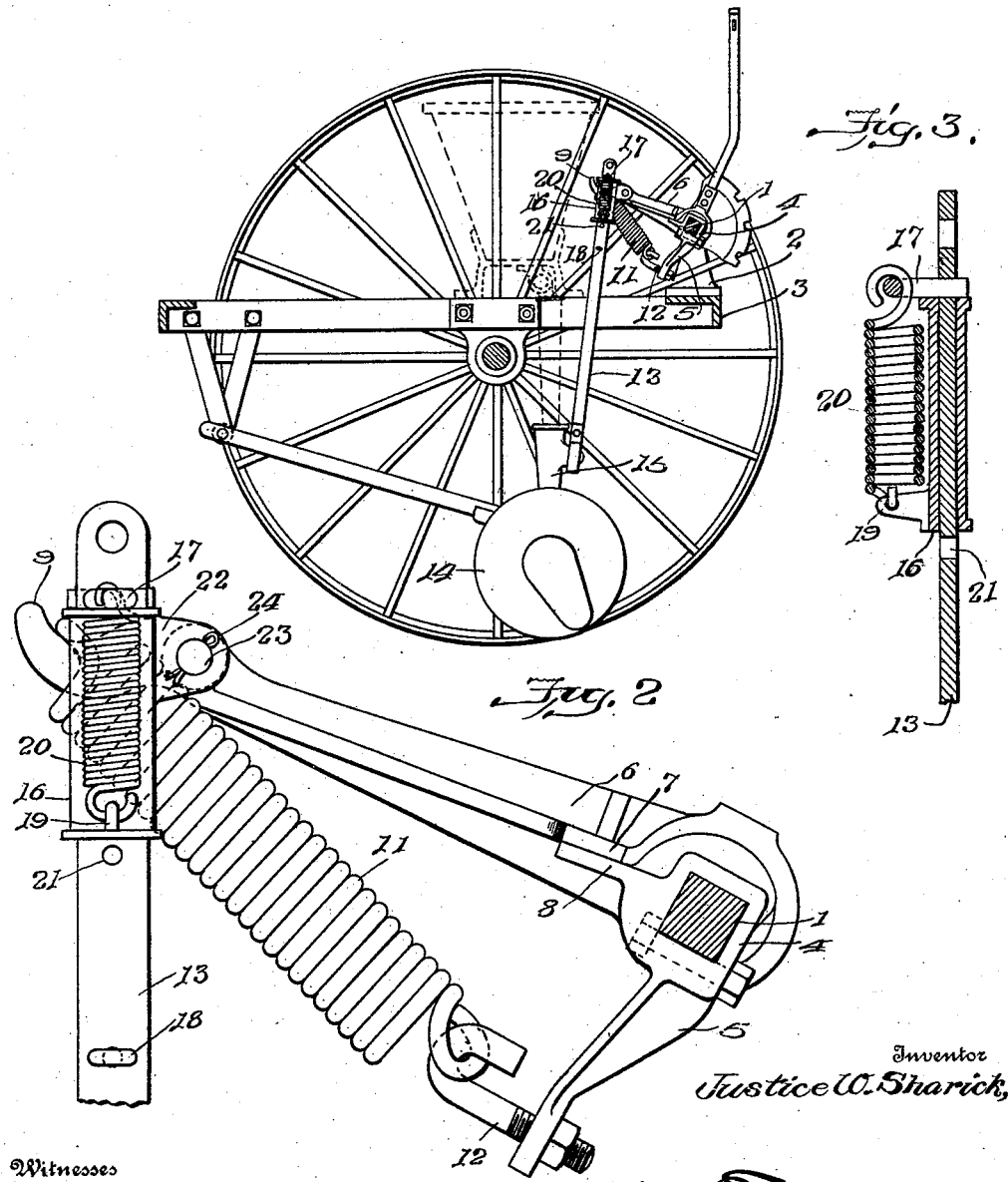
Witnesses
G. Howard Walmsley.
Edward L. Reed
Inventor
Justice W. Sharick,
By H. A. Toulmin,
Attorney

UNITED STATES PATENT OFFICE.

JUSTICE W. SHARICK, OF MARION, INDIANA.

PRESSURE DEVICE FOR GRAIN-DRILLS.

No. 861,323.   Specification of Letters Patent.   Patented July 30, 1907.

Application filed April 9, 1907. Serial No. 367,189.

*To all whom it may concern:*

Be it known that I, JUSTICE W. SHARICK, a citizen of the United States, residing at Marion, in the county of Grant and State of Indiana, have invented certain new and useful Improvements in Pressure Devices for Grain-Drills, of which the following is a specification, reference being had therein to the accompanying drawings.

The present invention relates to pressure devices for grain drills and is in the nature of an improvement upon the patent granted John W. Smith and Noah L. Heckman Jan'y. 31, 1905, No. 781,375.

The object of the invention is to provide a device of this character in which a greater variation of the pressure applied to the furrow openers may be obtained, thus adapting the machine for use in different kinds of soil and enabling the furrow opener to follow the inequalities in the surface of the ground and to be maintained in planting engagement therewith at all times.

To this end the improvement consists in interposing an auxiliary pressure device between the pressure rod and the main pressure device, the auxiliary device being of less strength than the main pressure device yields before the main pressure device yields, which is only after the auxiliary device has reached the limit of its movement.

With these objects in view my invention consists in certain novel features of construction and in certain parts and combinations to be hereinafter described, and then more fully pointed out in the claims.

In the accompanying drawings, Figure 1 is a sectional view of a grain drill showing the furrow opener, with the pressure device applied thereto, in elevation; Fig. 2 is a detail view of the pressure device; and Fig. 3 is a vertical section taken through the pressure rod and the auxiliary pressure device.

In these drawings, I have illustrated the preferred form of my invention and have shown the same as applied to the pressure device shown and described in the above mentioned patent, which, in turn, is embodied in a well known form of grain drill. The main pressure device consists of a shaft 1, extending substantially parallel with the row of furrow openers and journaled in suitable brackets 2 mounted on the frame 3 of the drill. Mounted on the shaft 1, which is preferably non-circular in cross section, are a series of sleeves 4 corresponding in number and arrangement to the number and arrangement of the furrow openers. These sleeves conform substantially to the contour of the shaft 1 and are provided near one end with a downwardly extending arm 5, which is preferably integral therewith, and has its opposite end rounded to provide a support for the end of the arm 6 which is rotatably mounted thereon and is provided with a finger or lug 7 adapted to engage a finger or projection 8 extending outwardly from the sleeve 4, thereby limiting the rotation of the arm 6 relatively to the sleeve 4. The outer end of the arm 6 is preferably provided with a hook 9 to which is secured one end of a spring 11, the opposite end of which is secured to the arm 5 of the sleeve 4 in any suitable manner, preferably by means of a hook 12 secured to said arm. The main features of the construction and operation of the main pressure device, thus far shown and described, are similar to that shown and described in the above mentioned Letters Patent.

The pressure rod 13 is connected at its lower end to the furrow openers 14 and is here shown as pivotally connected to the boot 15 which carries the furrow opener. On the upper end of the rod 13 is mounted a sleeve 16 which preferably conforms substantially to the shape of the rod 13 and has a free sliding movement thereon between fixed stops 17 and 18, which are here shown as consisting of split keys extending through apertures in the rod 13. The sleeve 16 is provided, preferably near its lower end, with a projection or lug 19, to which is secured one end of a spring 20, the opposite end of which is secured to the rod 13 near its upper end, and, as here shown, is secured to the upper stop or split key 17. The bar 13 may, if desired, be provided with one or more additional apertures 21 in which the key 18 may be placed to vary the amount of movement allowed the sleeve 16. The sleeve 16 is provided, preferably near its upper end, with an arm 22 which is provided near its outer end with an aperture adapted to extend over a pin or stud-shaft 23 and is held thereon by a suitable stop or key 24. The spring 20 is much smaller and of much less strength than the spring 11, and, consequently, yields under much less pressure than would affect the spring 11. The extent of the yielding of the auxiliary spring 20 is, as stated, limited by the stop 18 which limits its movement relatively to the sleeve 16, and, when engaged by the sleeve 16, forms a positive connection between the rod 13 and the arm 6 of the main pressure device, and the pressure applied to the furrow opener is then exerted directly upon the spring 11 of the main pressure device.

From the foregoing description it will be obvious that when pressure is exerted on the furrow openers, the rod 13 will rise and will move vertically relatively to the sleeve 16 and arm 6 against the tension of the spring 20, the tension of which is sufficient to hold the furrow openers in operative relation with the ground and cause the same to follow along the surface of the ground. But when the pressure or upward movement of the furrow openers is sufficient to move the rod 13 upward until the stop 18 comes into engagement with the sleeve 16, the rod 13 will be positively connected with the arm 6, which, in turn, is connected with the main spring 11 and the pressure of the furrow openers is then applied directly to this spring. Thus, it will be seen that by interposing the auxiliary pressure device between the main pressure device and the pressure rod, I have provided a pressure device, which, as a whole, is capable of more varied pressure than the old device, thereby causing the furrow openers to more closely follow the surface of the ground and adapting the same for use in different kinds of soil.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a pressure device of the character described, the combination, with a pressure rod, and a main pressure device connected thereto, of an auxiliary pressure device interposed between said pressure rod and said main pressure device.

2. In a pressure device of the character described, the combination, with a pressure rod, and a spring adapted to exert pressure thereon, of a resilient connection between said pressure rod and said spring.

3. In a pressure device of the character described, the combination, with a pressure rod, and a spring adapted to exert pressure thereon, of a resilient connection between said pressure rod and said spring, and a positive stop on said rod to limit the movement of said resilient connection and positively connect said pressure rod to said spring.

4. In a pressure device of the character described, the combination, with a pressure rod, and a spring adapted to exert pressure thereon, of a sliding connection between said rod and said spring, and a second spring controlling said sliding connection.

5. In a pressure device of the character described, the combination, with a pressure rod, and a spring adapted to exert pressure thereon, of a member slidably mounted on said pressure rod and connected to said spring, and a second spring connecting said sliding member to said pressure rod.

6. In a pressure device of the character described, the combination, with a pressure rod, and a main pressure device, of a sleeve slidably mounted on said pressure rod and connected to said main pressure device, and a spring connected at one end to said pressure rod and at the other end to said sleeve.

7. In a device of the character described, the combination, with a shaft, an arm rigidly secured thereto, a second arm rotatably mounted on said rod and extending at an angle to said first-mentioned arm, a spring connecting said arms, and a pressure rod, of a sleeve slidably mounted on said pressure rod and connected to said last-mentioned arm, and a spring extending between said sleeve and said pressure rod adapted to control the movement of the former.

8. In a pressure device of the character described, the combination, with a shaft, an arm rigidly secured thereto, a second arm rotatably mounted thereon, a spring connecting said arms, and a pressure rod, of a sleeve slidably mounted on said rod and pivotally connected to said second arm, a spring connected at one end to said rod and at the other end to said sleeve, and stops carried by said rod for limiting the movement of said sleeve relatively thereto.

In testimony whereof, I affix my signature in presence of two witnesses.

JUSTICE W. SHARICK.

Witnesses:
AUGUSTA PENCE,
CORA SAURNENIG.